United States Patent [19]

Schnitzius

[11] 4,383,595
[45] May 17, 1983

[54] GAS SPRING HAVING THREE DIFFERENT DAMPING-RATE STAGES

[75] Inventor: Klaus Schnitzius, Rheinbrohl, Fed. Rep. of Germany

[73] Assignee: Stabilus GmbH, Koblenz-Neuendorf, Fed. Rep. of Germany

[21] Appl. No.: 177,377

[22] Filed: Aug. 12, 1980

[30] Foreign Application Priority Data

Aug. 18, 1979 [DE] Fed. Rep. of Germany ....... 2933590

[51] Int. Cl.³ .......................... F16F 9/49; F16F 9/06
[52] U.S. Cl. .................................. 188/281; 188/284; 188/316; 267/120
[58] Field of Search ............... 188/281, 284, 316, 282, 188/311, 288; 267/64.26, 120, 124, 64.15; 16/66

[56] References Cited

U.S. PATENT DOCUMENTS

| | | | |
|---|---|---|---|
| 3,175,645 | 3/1965 | Schäfer et al. | 188/311 |
| 3,625,320 | 12/1971 | Doetsch et al. | 188/284 |
| 3,937,450 | 2/1976 | Bauer | 188/282 |
| 3,963,227 | 6/1976 | Mölders | 267/120 |
| 4,089,512 | 5/1978 | Allinquant et al. | 188/282 |
| 4,113,071 | 9/1978 | Müller et al. | 188/282 |

FOREIGN PATENT DOCUMENTS

| | | |
|---|---|---|
| 1857484 | 8/1962 | Fed. Rep. of Germany . |
| 7535393 | 3/1976 | Fed. Rep. of Germany . |
| 2752265 | 5/1979 | Fed. Rep. of Germany . |
| 691477 | 5/1953 | United Kingdom . |
| 758222 | 10/1956 | United Kingdom . |
| 925877 | 5/1963 | United Kingdom . |
| 998742 | 7/1965 | United Kingdom . |
| 1132038 | 10/1968 | United Kingdom . |
| 1178606 | 1/1970 | United Kingdom . |
| 1192846 | 5/1970 | United Kingdom . |

Primary Examiner—Douglas C. Butler
Assistant Examiner—R. R. Diefendorf
Attorney, Agent, or Firm—Brumbaugh, Graves, Donohue & Raymond

[57] ABSTRACT

In the illustrative embodiment of the invention disclosed, a pressurized gas spring is arranged to provide three different damping-rate states as the piston rod is progressively urged axially outward of the cylinder. A first damping-rate stage is provided by an axially movable ring carried by the piston structure, a second stage is provided by an axially movable sleeve member slidably mounted on the piston rod for engagement at its inner end with the piston structure, and a third stage is provided by entry of the outer end of the sleeve member into a damping cylinder mounted adjacent the end wall of the cylinder through which the piston rod extends. The three damping-rate stages act cumulatively increasingly to slow outward movement of the piston rod. In the disclosed embodiment, the gas spring is mounted so as to be in the rod-down orientation when the piston rod is fully retracted, and the sleeve member is moved by gravitational force into engagement with the piston structure, thereby initiating the second damping-rate stage, when the gas spring moves to the rod-up orientation during use.

19 Claims, 2 Drawing Figures

GAS SPRING HAVING THREE DIFFERENT DAMPING-RATE STAGES

BACKGROUND

1. Field of the Invention

This invention relates to gas springs and, more specifically, to new and improved structure for providing enhanced damping of the rate of movement of the piston rod outward of the cylinder as the cylinder approaches its outermost position. The invention has particular application to uses in which the gas spring is mounted in the rod-down orientation when the piston rod is fully retracted and moves to the rod-up orientation as the piston rod travels outward of the cylinder.

2. The Prior Art

Gas springs having provision for damping the rate of outward movement of the piston rod as the rod nears its outermost position are known in the art. Such a gas spring is disclosed, for example, in U.S. Pat. No. 3,963,227. In that patent, a cup-shaped damping cylinder is provided at the inner end of the piston rod member and an annular damping piston is fixed to the cylinder in surrounding relation to the piston rod. As the piston rod nears the outermost position, the damping cylinder carried by the piston rod telescopes over the fixed damping piston to slow the rate of outward movement. Although this prior art structure is generally useful, it is comparatively complicated in design and expensive. Also, it affords only one further stage of damping, whereas in certain applications a plurality of additional damping rate-stages is needed or desirable.

SUMMARY

It is therefore an object of the invention of provide a gas spring which includes provision for enhanced damping of piston rod movement as the rod approaches its outermost position and to do so in a highly reliable, yet simple and inexpensive manner.

Another object of the invention is to provide a multi-stage damping effect in dependence upon both the piston rod approaching its outermost position and upon the gas spring changing from a rod-down orientation to a rod-up orientation.

These and other objects are attained, in accordance with the invention, by the provision of a damping cylinder within the main cylinder adjacent the end wall thereof through which the piston rod extends and a cooperating damping piston on the piston rod member, the damping piston entering the damping cylinder as the piston rod nears its outermost position and thereby further damping the rate of outward movement of the piston rod. The damping piston is axially movable with respect to said piston rod member between a first terminal position nearer to the main piston unit of the gas spring and a second terminal position more remote from the main piston unit. According to the invention, the damping piston operates as first damping valve by covering a part of the flow cross section of the fluid passage across the main piston unit when it is in its first terminal position, thus increasing the flow resistance of that fluid passage and thereby increasing the damping effect. When in its second terminal position, the damping piston is clear of the flow passage across the main piston unit and thus does not impede piston rod movement. Preferably, a second damping valve is provided for increasing the flow resistance of the fluid passage across the main piston unit in response to movement of the piston rod in the outward direction. The first and second damping valves are sized and configured so that the first damping valve, when in the first terminal position, effects an additional increase in the flow resistance of the fluid passage beyond the flow resistance increase effected by the second damping valve in response to outward movement of the piston rod member. The first damping valve thus affords a second stage of damping. The damping piston and cylinder are then further sized and configured to provide still an additional, or third stage, increase in damping effect as the piston rod nears its outermost position.

Preferably, the damping piston moves between the first and second terminal positions under its own weight whenever the orientation of the gas spring changes from rod-down to rod-up and vise versa. Inasmuch as the damping piston is only operative to increase the damping effect when in the first terminal position, i.e., in a rod-up orientation, it will be appreciated that the gas spring of the invention can afford either a two-stage damping effect or a three-stage damping effect, the former where the gas spring is used only in a rod-down orientation (thereby eliminating the function of the damping piston) and the latter where the gas spring is used either entirely rod-up or where the orientation changes from the rod-down to rod-up orientation during use.

BRIEF DESCRIPTION OF THE DRAWINGS

For a better understanding of the invention, reference may be made to the following detailed description of an exemplary embodiment thereof, in which.

DETAILED DESCRIPTION

Figure 1:
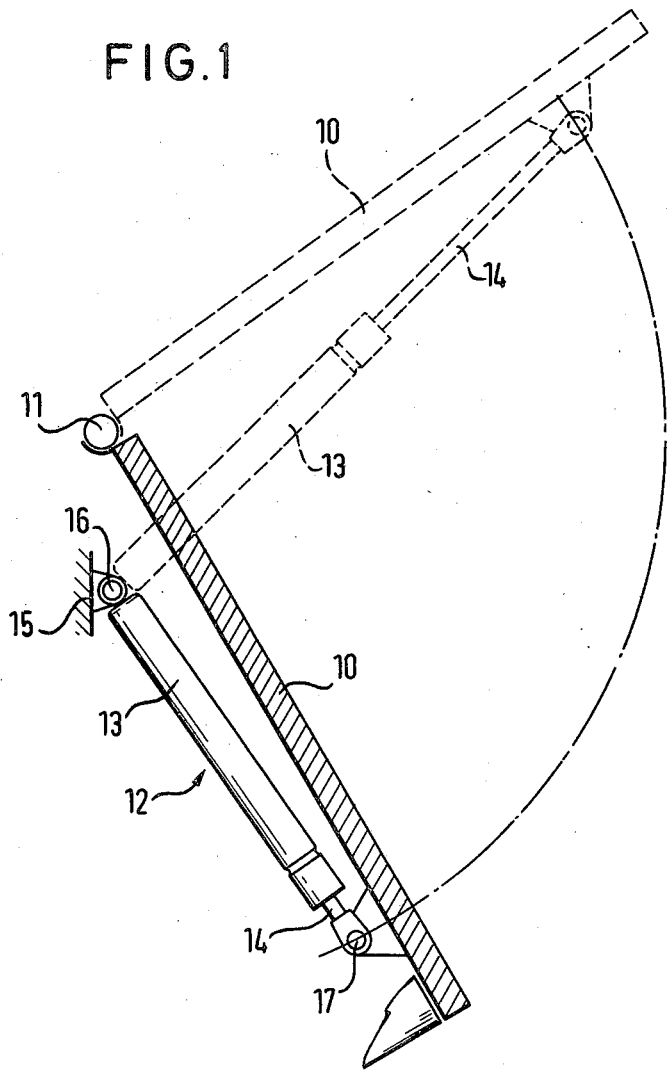
FIG. 1 illustrates an application of a gas spring constructed in accordance with the invention for balancing the weight of a pivotable lid or closure member.

In FIG. 1, there is shown a trunk lid or closure member 10 which is pivotably attached to the frame of a vehicle by a hinge 11. The trunk lid 10 is shown in full lines in the closed position and in dotted lines in the open position. A gas spring 12, including a cylinder 13 and a piston rod 14, is pivotally mounted between the frame 15 of the vehicle and the trunk lid 10, with the cylinder 13 being hinged at 16 to the frame 15 and the piston rod 14 being hinged at 17 to the trunk lid 10. The cylinder 13 preferably contains a gas under pressure, and this gas pressure urges the piston rod 14 outward of the cylinder 13. As will be appreciated, therefore, the outward force of the gas spring assists in lifting the trunk lid 10 from the position shown in full lines to the position shown in dotted lines.

Figure 2:
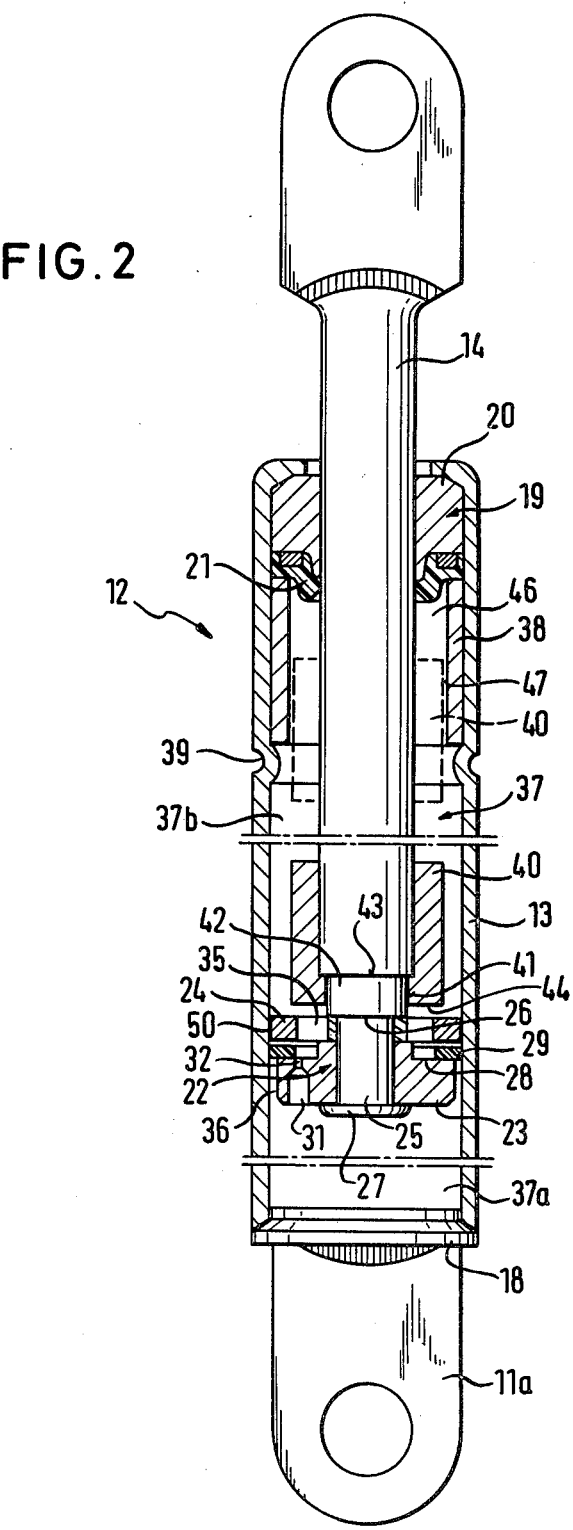
FIG. 2 is a longitudinal cross sectional view of one embodiment of a gas spring of the invention.

A preferred embodiment of the gas spring is shown in more detail in FIG. 2. The cylinder 13 is closed at one end by an end wall 18, to which a hinge member 11a is fixed. At the other end of the cylinder member 13, there is provided a piston rod guiding and sealing unit 19 which includes a guiding member 20 and a sealing member 21. The piston rod 14 extends through the unit 19 for axial movement relative to the cylinder 13 and is sealed relative thereto by the sealing member 21. A piston unit 22, including a piston member 23 and a piston disk 24, is carried by the piston rod 14 at its inner end. Both the piston member 23 and the piston disk 24 are suitably mounted on an extension 25 of reduced diameter at the inner end of the piston rod 14, and both are fixed against axial movement by a shoulder 26 of the piston rod 14 and by a rivet 27 or other suitable fastener secured to the end of the extension 25. An annular groove 28, open in the radial direction, is defined between the piston member 23 and the piston disk 24. A piston ring 29 is received in the annular groove 28, but is smaller in axial width than the groove 28 so as to be free to move axially therein for a purpose described hereinafter. The piston ring 29 is in slight frictional engagement with the inner circumferential face of the cylinder 13.

One or more axial bores 31 (only one of which is illustrated in FIG. 2) are provided in the piston member 23. Preferably each bore 31 is shaped at its upper (as seen in FIG. 2) end as a throttle 32 to restrict fluid flow therethrough. The throttle or throttles 32, as the case may be, are situated radially inward of the radial inner diameter of the piston ring 29 so as to be clear of the ring 29. The piston disk 24 is provided with a plurality of apertures 35, which are spaced around the circumference of the extension 25. As shown in FIG. 2, the external diameter of the piston member 23 is smaller than the internal diameter of the cylinder 13, thereby defining a gap 36 between the piston member 23 and the cylinder 13. The number and size of the throttles 32 are preferably selected so that the total cross sectional area thereof is considerably less than the cross sectional area of the gap 36. The outer diameter of the piston disk 24 is nearly equal to the inner diameter of the cylinder 13, but preferably is slightly less so that a small gap 50 also exists therebetween. The cross sectional area of this latter gap 50 is preferably smaller than the total cross sectional area of the throttles 32.

Within the cylinder 13 there is defined a cavity 37 which is divided by the piston unit 22 into two working chambers 37a and 37b. At the upper end of the cylinder 13 (as shown in FIG. 2) there is provided a damping cylinder or sleeve 38. At its upper end, the sleeve 38 engages the sealing member 21 and, at its lower end, an annular depression 39 formed in the cylinder 13. A damping piston shaped as a piston sleeve 40 is slidably mounted on the piston rod 14. At the lower end of the piston sleeve 40, there is provided a radially inwardly directed flange 41. The flange 41 surrounds an axial section 42 of the piston rod 14 of smaller diameter than the main portion of the piston rod and of larger diameter than the aforementioned section 25. A shoulder 43 is defined at the transition from the main portion of the piston rod 14 to the section 42. The piston sleeve 40 is free to move axially along the piston rod 14 between the position (shown in FIG. 2) in which the upper surface of the annular flange 41 engages the shoulder 43 and a second position (not shown) in which the lower end 44 of the flange 41 engages the upper surface of the piston disk 24. The sleeve 40 is preferably made of plastic material.

The cylinder 13 is filled with pressurized gas, the pressure of which acts on the cross sectional area of the piston rod 14 and urges the piston rod 14 outwardly of the cylinder 13 (in upward direction as shown in FIG. 2).

The operation of the gas spring is as follows:

When the piston rod 14 is pushed inward (downward as shown in FIG. 2) against the expelling force of the pressurized gas, the piston ring 29 moves from the position of FIG. 2 to a position of contact with the piston disk 24. In these circumstances, the gas flows from working chamber 37a through the gap 36 and around the inner edge of the piston ring 29. The gas can also flow through the apertures 35, the piston sleeve 40 being lifted to the position shown in FIG. 2 by the gas flowing through apertures 35. Hence, inward movement of the piston rod 14, corresponding to the closing of the trunk lid 10 as seen in FIG. 1, is relatively undamped.

When the trunk lid 10 is opened, however, i.e. when the trunk lid 10 is brought from the position shown in full lines in FIG. 1 to the position shown in dotted lines, the piston rod 14 moves outward of the cylinder 13. During this outward movement, the piston ring 29 assumes the position shown in FIG. 2, i.e. in contact with the piston member 23, thereby closing the gap 36. As long as the piston rod 14 is directed downwardly (as shown in FIG. 1), the piston sleeve 40 remains in the position of FIG. 2. During this first stage in the outward movement of the piston rod 14, the gas can flow from the working chamber 37b to the working chamber 37a through the throttle or throttles 32 and the apertures 35, the apertures 35 being clear of the piston sleeve 40. As the total cross sectional area of the throttle or throttles 32 is considerably smaller than the cross sectional area of the gap 36, outward movement of the piston rod 14 with respect to the cylinder is damped.

Upon movement of the trunk lid 10 from the position shown in full lines of FIG. 1 to the position shown in dotted lines, it will be seen that the orientation of the gas spring 12 is altered from the rod-down orientation to the rod-up orientation. When the gas spring 12 has passed the horizontal position, the outer end of the piston rod 14 inclines upwardly toward the dotted line position of FIG. 1. The piston sleeve 40 thereupon falls under gravitational force into contact with the piston disk 24, so that thereafter the apertures 35 are closed. As will be appreciated, this give rise to a further damping stage inasmuch as the gas in working chamber 37b is now prohibited from flowing through the apertures 35 and can only flow through the gap 50 defined between the outer circumferential face of the piston disk 24 and the inner circumferential face of the cylinder 13. Having passed this gap 50, the gas can flow again through the throttles 32. As previously mentioned, the cross sectional area of the gap 50 is smaller than the total cross sectional area of the throttle or throttles 32. Thus outward movement of the piston rod 14 is still further damped in this second stage of movement.

When, upon continued outward movement of the piston rod 14, the piston sleeve 40 enters the sleeve 38 (as shown in dotted lines in FIG. 2), a substantially closed damping chamber 46 is established, the only fluid outlet from which is via the gap 47 defined between the external circumferential face of the piston sleeve 40 and the internal circumferential face of the sleeve 38. This gap allows the pressurized fluid in the damping chamber 46 to escape into the lower part of the working chamber 37b. In accordance with the invention, the cross sectional area of the gap 47 is dimensioned in such a way that an additional damping effect is achieved, thereby providing a third damping stage as the piston rod nears its outermost position. As best seen from the dotted representation of the sleeve 40 in FIG. 2, the outer circumferential face of the piston sleeve 40 is preferably conical in configuration so as to taper gradually outwardly. As a result, the cross sectional area of the gap 47 decreases as the piston sleeve 40 moves farther into the sleeve 38. During upward movement of the piston sleeve 40 within the sleeve 38, a downward directed force acts on the sleeve 40 due to the increased pressure in the damping chamber 46. By virtue of this downward directed force, the end face 44 of the piston sleeve 40 is pressed against the piston disk 24 so that the apertures 35 remain tightly closed.

Although the invention has been described and illustrated herein by reference to a specific embodiment thereof, it will be understood that many modifications and variations of such embodiments may be made without departing from the inventive concepts disclosed. For instance, while the working fluid used in the cylinder has been referred to herein as a pressurized gas, a small amount of liquid, such as an hydraulic oil, could be added to the cylinder if desired. All such modifications and variations, therefore, are intended to be encompassed within the spirit and scope of the appended claims.

I claim:

1. In a gas spring including a cylinder member having an axis and two end walls and defining a fluid-tight cavity therein; a piston rod member extending through one end wall in sealed relation thereto for axial movement inward and outward of said cavity between an innermost position and an outermost position; a piston unit carried by said piston rod member internally of said cylinder member and separating said cavity into first and second working chambers; fluid passage means extending through said piston unit for connecting said first and said second working chambers to permit fluid flow therebetween in response to axial movement of said piston rod member and said piston unit; a body of pressurized fluid within said cavity; and means for damping the rate of outward movement of said piston rod member; the improvement comprising:

said damping means comprising first damping valve means and second damping valve means within said fluid passage means; said first damping valve means and said second damping valve means being arranged in series;

both said first damping valve means and said second damping valve means being movable between a closed condition and an open condition, first throttled by-pass means and second throttled by-pass means by-passing said first damping valve means and said second damping valve means, respectively, in the respective closed conditions; said first throttled by-pass means and said second throttled by-pass means being connected in series when said first damping valve means and said second damping valve means are in said respective closed conditions, said first throttled by-pass means having a smaller cross-sectional area than said second throttle by-pass means;

said second damping valve means comprising a piston ring engaging the inner cylindrical face of said cylinder member and being housed in a circumferential groove of said piston unit at an axially intermediate location of said piston unit, said circumferential groove having an invariable axial width larger than the axial width of said piston ring, said piston ring being axially movable within said circumferential groove between a first terminal position remote from said one end wall, in which first terminal position said second damping valve means are in said closed condition and a second terminal position closer to said one end wall, in which second terminal position said second damping valve means are in said open condition, said first terminal position occurring in response to outward movement of said piston rod member and said second terminal position occurring in response to inward movement of said piston rod member; p1 said first damping valve means comprising a valve member axially movable with respect to said piston unit to a limited extent, said valve member cooperating with an end face of said piston unit remote from said circumferential groove and directed toward said one end wall so as to open and close, respectively, the exit of a fluid passage extending within said piston unit from said circumferential groove to said end face, said valve member being connected to a damping piston, said damping piston entering into a damping cylinder, provided within said cavity adjacent said one end wall thereof, as said piston rod member approaches said outermost position and defining therewith a damping chamber, and means defining a throttled fluid path between said damping chamber and said second working chamber adjacent said one end wall to further dampen the outward rate of further movement of said piston rod member, said valve member being held in a closing position with respect to said fluid passage when said damping piston enters into said damping cylinder.

2. The gas spring of claim 1, wherein said damping piston, when at said first terminal position, covers a part of the flow cross section of said fluid passage means so as to increase the flow resistance of said fluid passage means and thereby dampen outward movement of said piston rod member and, when at said second terminal position, uncovers said part of said fluid passage means so as to reduce the flow resistance of said fluid passage means, said damping piston thereby operating as a first damping valve means for controlling the rate of movement of said piston rod member.

3. The gas spring of claim 2, wherein:

said damping piston includes a radially inward directed annular flange;

said piston rod includes a first axial section of reduced diameter relative to an adjacent axially outward section of said piston rod, thereby defining a first shoulder at the juncture of said two sections of said piston rod member, said first shoulder being directed towards the other end wall; and said annular flange encircles said reduced diameter section and engages said first shoulder when said damping piston is in said second terminal position.

4. The gas spring of claim 3, wherein:

said damping piston includes an end face directed towards said other end wall; and means carried by said piston rod member defines an abutment face directed towards said one end wall for engagement with said end face of said damping piston when said damping piston is in said first terminal position.

5. The gas spring of claim 4, wherein said abutment face defining means comprises a surface on said piston unit.

6. The gas spring of claim 5, wherein said fluid passage means includes second damping valve means responsive to outward movement of said piston rod member relative to said cylinder member for increasing the flow resistance of said fluid passage means and to inward movement of said piston rod member relative to said cylinder member for decreasing the flow resistance of said fluid passage means.

7. The gas spring of claim 6, wherein said first damping valve means effects an additional increase of the flow resistance of said fluid passage means when said damping piston is brought into said first terminal position as compared with the flow resistance already increased by said second damping valve means in response to outward movement of said piston rod member.

8. The gas spring of claim 7, wherein said damping piston is made of plastic material.

9. The gas spring of claim 7, wherein the flow resistance of said throttled fluid path defining means effects an additional damping of the rate of outward movement of said piston rod member when said damping piston enters said damping cylinder as compared to the damping already effected by said first and second damping valve means.

10. The gas spring of claim 2, wherein said damping piston is movable between said first and second terminal positions with respect to said piston rod member under its own gravitational weight in dependence upon the orientation of the gas spring.

11. The gas spring of claim 3, wherein said piston rod member includes a second axial section of reduced diameter relative to said first axial section, said second section being axially inward of and adjacent to said first section so as to define at the juncture of said first and second sections a second shoulder directed towards said other end wall; and
   said piston unit is axially fixed with respect to said piston rod member by said second shoulder, on the one hand, and means secured to the innermost end of said second section, on the other hand.

12. The gas spring of claim 1, wherein said pressurized fluid comprises at least in part a pressurized gas.

13. The gas spring of claim 12, wherein a small amount of liquid is present within said cavity.

14. A gas spring as set forth in claim 1, wherein the unit comprising said valve member and said damping piston is axially movable in response to the orientation of said gas spring in space such that said valve member closes said fluid passage when said piston rod member extends in an upward direction from said piston unit.

15. The gas spring of claim 14, wherein said throttled fluid path defining means comprises the annular gap between the interior circumferential face of said damping cylinder and the exterior circumferential face of said damping piston.

16. The gas spring of claim 15, wherein said exterior circumferential face of said damping piston is slightly conical and converges in the direction of said one end wall.

17. The gas spring of claim 14, wherein the outer circumferential surface of said damping cylinder is radially adjacent the inner circumferential surface of said cylinder member.

18. The gas spring of claim 17, wherein said damping cylinder is axially fixed between said one end wall and a radially inward directed abutment carried by said cylinder member.

19. In a gas spring including a cylinder member having an axis and two end walls and defining a fluid-tight cavity therein; a piston rod member extending through one end wall in sealed relation thereto for axial movement inward and outward of said cavity between an innermost position and an outermost position; a piston unit carried by said piston rod member internally of said cylinder member and separating said cavity into first and second working chambers; fluid passage means extending through said piston unit for connecting said first and said second working chambers to permit fluid flow therebetween in response to axial movement of said piston rod member and said piston unit; a body of pressurized fluid within said cavity; and means for damping the rate of outward movement of said piston rod member; the improvement comprising:
   said damping means comprising first damping valve means and second damping valve means within said fluid passage means; said first damping valve means and said second damping valve means being arranged in series;
   both said first damping valve means and said second damping valve means being movable between a closed condition and an open condition, first throttled by-pass means and a second throttled by-pass means by-passing said first damping valve means and said second damping valve means, respectively, in the respective closed conditions; said first throttled by-pass means and said second throttled by-pass means being connected in series when said first damping valve means and said second damping valve means are in said respective closed conditions, said first throttled by-pass means having a smaller cross-sectional area than said second throttled by-pass means;
   said second damping valve means comprising a piston ring engaging the inner cylindrical face of said cylinder member and being housed in a circumferential groove of said piston unit at an axially intermediate location of said piston unit, said circumferential groove having an invariable axial width larger than the axial width of said piston ring, said piston ring being axially movable within said circumferential groove between a first terminal position remote from said one end wall, in which first terminal position said second damping valve means are in said closed condition and a second terminal position closer to said one end wall, in which second terminal position said second damping valve means age in said open condition, said first terminal position occurring in response to outward movement of said piston rod member and said second terminal position occurring in response to inward movement of said piston rod member, said first damping valve means effecting an additional increase of the flow resistance of said fluid passage means when said damping piston is brought into said first terminal position as compared with the flow resistance already increased by said second damping valve means in response to outward movement of said piston rod member;
   said first damping valve means comprising a valve member axially movable with respect to said piston unit to a limited extent, said valve member cooperating with an end face of said piston unit remote from said circumferential groove and directed toward said one end wall so as to open and close, respectively, the exit of a fluid passage extending within said piston unit from said circumferential groove to said end face, said valve member being connected to a damping piston, said damping piston entering into a damping cylinder, provided within said cavity adjacent said one end wall thereof, as said piston rod member approaches said outermost position and defining therewith a damping chamber, and means defining a throttled fluid path between said damping chamber and said second working chamber adjacent said one end wall to further dampen the outward rate of further movement of said piston rod member, said valve member being held in a closing position with respect to said fluid passage when said damping piston enters into said damping cylinder.

* * * * *

UNITED STATES PATENT AND TRADEMARK OFFICE
CERTIFICATE OF CORRECTION

PATENT NO. : 4,383,595

DATED : May 17, 1983

INVENTOR(S) : Klaus Schnitzius

It is certified that error appears in the above—identified patent and that said Letters Patent is hereby corrected as shown below:

Column 6, line 4, "occurrring" should be --occurring--;

Column 6, line 5, "pl" should be deleted and "said first" should start a new paragraph;

Column 8, line 44, "age" should read --are--.

Signed and Sealed this

Twenty-second Day of November 1983

[SEAL]

Attest:

Attesting Officer

GERALD J. MOSSINGHOFF

Commissioner of Patents and Trademarks